United States Patent
Chen et al.

(10) Patent No.: US 9,335,841 B2
(45) Date of Patent: May 10, 2016

(54) COMPUTER READABLE MEDIA CAN PERFORM INTERFERENCE IMAGE DETERMINING METHOD AND INTERFERENCE IMAGE DETERMINING APPARATUS

(75) Inventors: Hsin-Chia Chen, Hsin-Chu (TW);
Yen-Min Chang, Hsin-Chu (TW);
Yu-Hao Huang, Hsin-Chu (TW);
Wen-Han Yao, Hsin-Chu (TW);
Ching-Lin Chung, Hsin-Chu (TW);
Yung-Chang Lin, Hsin-Chu (TW);
Tsung-Fa Wang, Hsin-Chu (TW);
Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 221 days.

(21) Appl. No.: 13/562,285

(22) Filed: Jul. 30, 2012

(65) Prior Publication Data
US 2013/0236051 A1 Sep. 12, 2013

(30) Foreign Application Priority Data
Mar. 7, 2012 (TW) .............................. 101107630 A

(51) Int. Cl.
*G06K 9/00* (2006.01)
*G06F 3/0354* (2013.01)
*G06F 3/042* (2006.01)

(52) U.S. Cl.
CPC ............ *G06F 3/03547* (2013.01); *G06F 3/042* (2013.01); *G06F 2203/0338* (2013.01)

(58) Field of Classification Search
None
See application file for complete search history.

(56) References Cited

U.S. PATENT DOCUMENTS

| 2004/0263859 A1 * | 12/2004 | Chang et al. | 356/497 |
| 2005/0157942 A1 * | 7/2005 | Chen et al. | 382/275 |
| 2006/0115177 A1 * | 6/2006 | Ishiga | H04N 1/4097 382/275 |
| 2007/0211957 A1 * | 9/2007 | Ou et al. | 382/266 |
| 2010/0207872 A1 * | 8/2010 | Chen et al. | 345/156 |

* cited by examiner

*Primary Examiner* — Hadi Akhavannik
(74) *Attorney, Agent, or Firm* — Winston Hsu; Scott Margo

(57) ABSTRACT

A computer readable media having at least one program code recorded thereon. An interference image determining method can be performed when the program code is read and executed. The interference image determining method comprises: (a) controlling a light source to illuminate an object on a detecting surface to generate an image; (b) controlling a sensor to catch a current frame of the image; (c) utilizing an image characteristic included in the current frame to determine a interference image part of the current frame; and (d) updating a defined interference image according to the determined interference image part.

26 Claims, 4 Drawing Sheets

(a)

(b)

COMPUTER READABLE MEDIA CAN PERFORM INTERFERENCE IMAGE DETERMINING METHOD AND INTERFERENCE IMAGE DETERMINING APPARATUS

CROSS-REFERENCE TO RELATED APPLICATIONS

This application claims the benefit of Taiwan Patent Application No. 101107630 filed Mar. 7, 2013, and incorporated herein by reference in its entirety.

BACKGROUND OF THE INVENTION

1. Field of the Invention

The present invention relates to an interference image determining method and an interference image determining apparatus utilizing the interference image determining method, and particularly relates to an interference image determining method utilizing the image characteristic of a caught current frame to update a defined interference image, and an interference image determining apparatus utilizing the interference image.

2. Description of the Prior Art

As related tech rapidly grows, the mouse utilizing a rolling ball or other apparatuses such as a tracking ball is replaced by an optical mouse or an optical touch control apparatus. Such optical mouse or optical touch control apparatus can be regarded as an optical replacement estimating apparatus, since these apparatuses determine a related displacement between a detecting surface of the apparatus and an object.

FIG. 1 is a schematic diagram illustrating a prior art optical displacement estimating apparatus 100, for determining displacement for a finger on a detecting surface. FIG. 1(a) illustrates a cross sectional view of the optical displacement estimating apparatus 100, and FIG. 1(b) illustrates a block diagram for a circuit controlling the operation for the optical displacement estimating apparatus 100. The optical displacement estimating apparatus 100 includes a detecting surface 103, a light source 105, a detector 107, lens 109, 111, a processing unit 113, a storage apparatus 115 and a light source controlling unit 117. The operation of the light source 105 is controlled by the light source controlling unit 117 and illuminates the finger 101 on the detecting surface 103 to generate in image. The detector 107 catches the frame in the image, and the processing unit 113 computes displacement of the finger 101 according to the caught frame. Also, the processing unit 113 controls data accessing of the storage apparatus 115 and the operation of the light source controlling unit 117.

However, some objects on the detecting surface 103, such as scraping trace, finger print or dust, may form an interference image in the caught frame such that the displacement estimation becomes un-accurate. Some related techniques are developed to solve these problems, but these techniques need extra hardware cost or complicated algorithm.

SUMMARY OF THE INVENTION

One objective of the present invention is to provide an effective interference image determining method and interference image determining apparatus needing no extra hardware and complicated algorithm.

One embodiment of the present invention discloses a computer readable media having at least one program code recorded thereon. An interference image determining method can be performed when the program code is read and executed. The interference image determining method comprises: (a) controlling a light source to illuminate an object on a detecting surface to generate an image; (b) controlling a sensor to catch a current frame of the image; (c) utilizing an image characteristic included in the current frame to determine a interference image part of the current frame; and (d) updating a defined interference image according to the determined interference image part.

One embodiment of the present invention discloses a n interference image determining apparatus comprises: a detecting surface; a light source; a processing unit, for controlling the light source to illuminate an object on a detecting surface to generate an image; a sensor, for capturing a current frame of the image; and a storage apparatus, for storing a defined interference image; wherein the processing unit utilizes an image characteristic included in the current frame to determine a interference image part of the current frame, and updates a defined interference image according to the determined interference image part.

The above-mentioned embodiments can be performed via writing a firmware into a processing unit. Alternatively, the above-mentioned embodiment can be performed via writing a program code into a computer readable media and executing the program code. Therefore, unnecessary hardware and cost can be saved. Additionally, the interference image determining method provided by the present invention can compute the interference image part via simple steps, thus no complicated algorithm is needed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
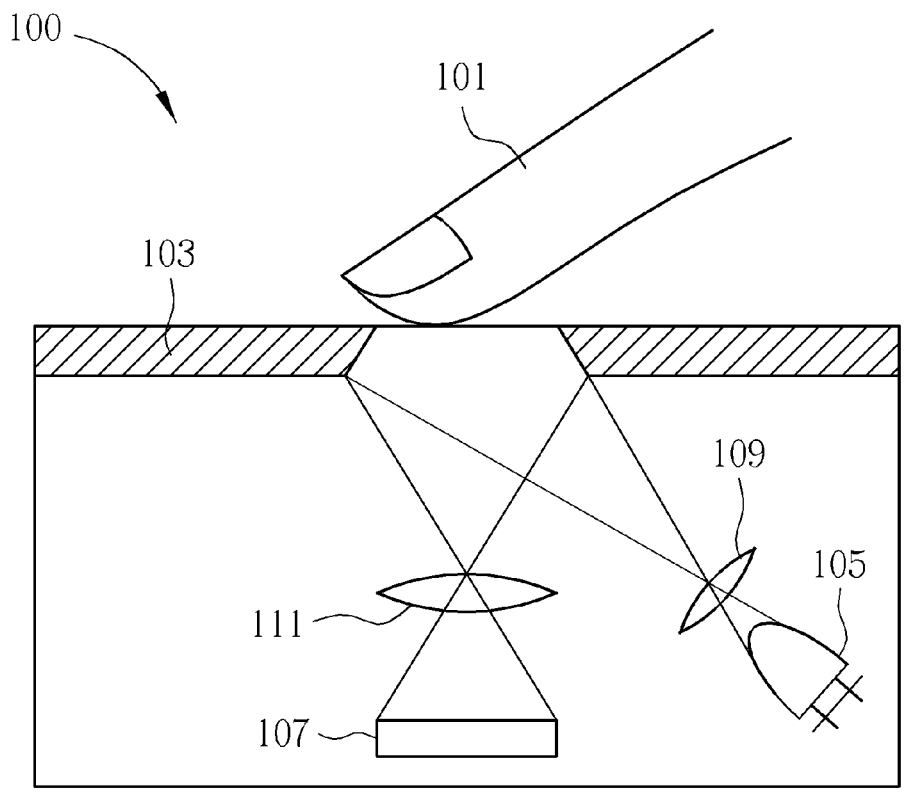
FIG. 1 is a schematic diagram illustrating a prior art optical displacement estimating apparatus.
Figure 1:
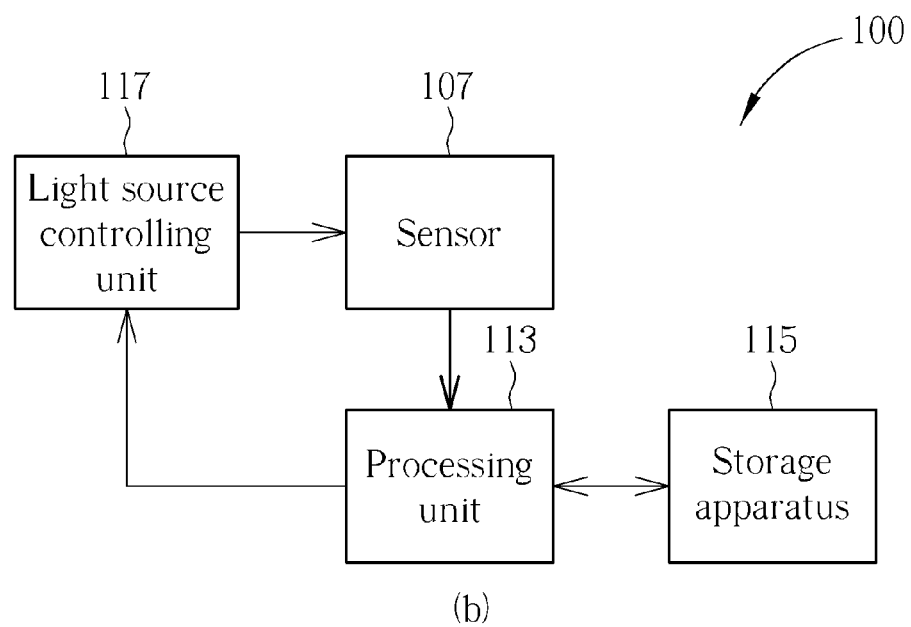

Please note the following description utilizes the optical displacement estimating apparatus 100 to explain the concept of the present invention, but it does not mean the concept of the present invention can only be applied to the optical displacement estimating apparatus 100 in FIG. 1 (in this case, the optical displacement estimating apparatus can be regarded as an interference image determining apparatus). The interference image determining method can also be applied to other apparatuses that can perform the same function. Additionally, the following concept utilizes an optical displacement estimating apparatus having a detecting surface upward to detect displacement of a finger. However, an optical displacement estimating apparatus having a detecting surface downward such that the optical displacement estimating apparatus can be put on a plane to move a cursor such as an optical mouse should also fall in the scope of the present invention.

An optical displacement estimating apparatus can operate in two modes: an operating mode and a non operating mode. The non operating mode is a mode that a finger has a long distance away from the detecting surface, such that the sensor can not detect the displacement for the finger. Operating mode is a mode that a finger touches the detecting surface or a finger has a short distance away from the detecting surface such that the sensor can detect displacement for the finger. In these two modes, different consideration should be taken for updating the defined interference image. The embodiment according to the present invention shown in FIG. 2 will take these two situations into consideration.

Figure 2:
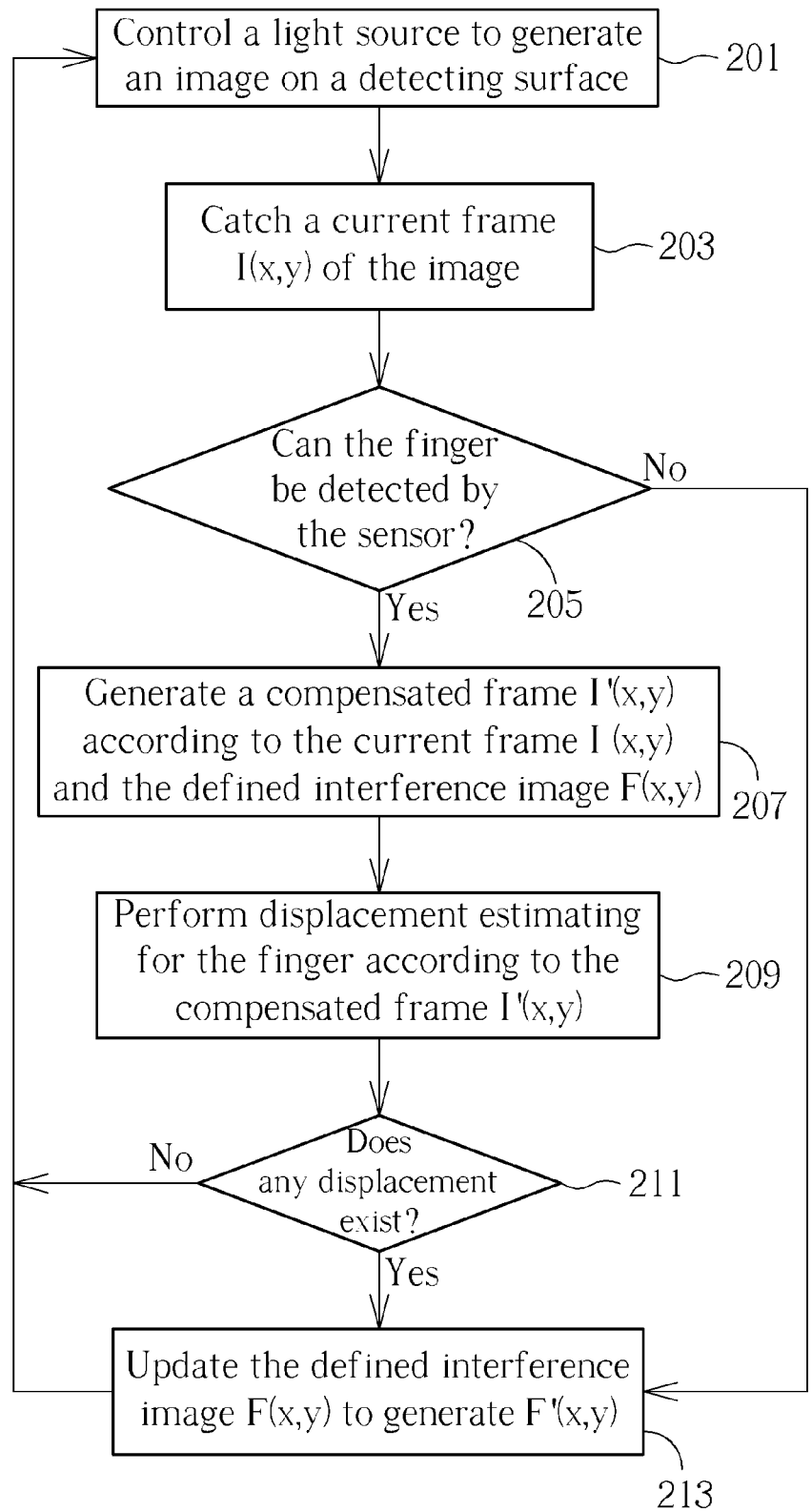
FIG. 2 is a flow chart illustrating detail steps for an interference image determining method according to one embodiment of the present invention.

FIG. 2 is a flow chart illustrating detail steps for an interference image determining method according to one embodiment of the present invention, which includes the following steps:

Step 201

Control a light source to illuminate an object, such as a finger or any object that be utilized for touch control, on a detecting surface to generate an image.

Step 203

Catch a current frame $I(x,y)$ of the image.

Step 205

Determine if the finger can be detected by the sensor? If yes, go to step 207, if not go to step 213 to directly update defined interference image $F(x,y)$ to generate a new defined interference image $F'(x,y)$. The reason that the defined interference image $F(x,y)$ can be directly updated in this embodiment is that if the finger can not be detected and interference objects generate interference images exist on the detecting surface, then the current frame caught in the step 203 includes only interference image part. Therefore such image can be directly utilized to update the defined interference image $F(x,y)$, which can be stored in the storage apparatus shown in FIG. 1.

Step 207

Generate a compensated frame $I'(x,y)$ according to the current frame $I(x,y)$ and the defined interference image $F(x,y)$. Other detail concept will be described as below.

Step 209

Perform displacement estimating for the finger according to the compensated frame $I'(x,y)$.

Step 211

Determine if any displacement is estimated, if yes, go to step 213, if not, go back to step 201 to prepare a next turn determining.

Step 213

Update the defined interference image $F(x,y)$ to generate $F'(x,y)$.

In this embodiment, the reason that the displacement is determined first then the interference image part is determined is that the caught current frame includes a still finger image and interference image part if the finger can be detected but has no displacement, thus the interference image part can not be determined. However, the image can be classified into a still image part and a moving image part if the finger has displacement, thus the interference image part can be determined thereby. In this embodiment, if the finger has displacement, the still image part can be directly regarded as an interference image part.

Figure 3:
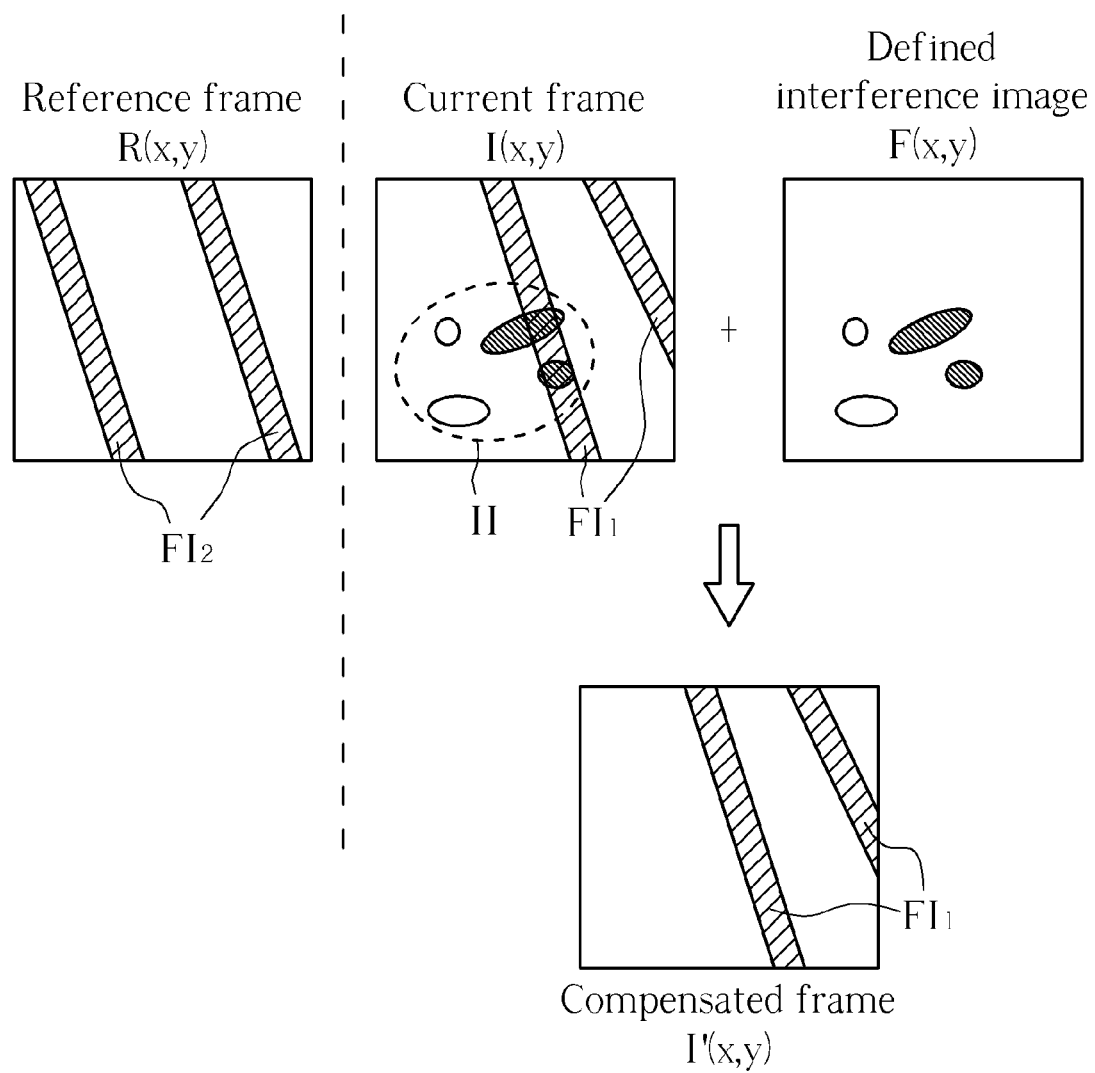
FIG. 3 is a schematic diagram illustrating the operation of the interference image determining method according to one embodiment of the present invention.

FIG. 3 is a schematic diagram illustrating the operation of the interference image determining method according to one embodiment of the present invention. FIG. 3 depicts the concept of the steps 207-211 in FIG. 2. Please also refer to the apparatus shown in FIG. 1 to understand the concept of the present invention for more clear. After the processing unit 113 receives the current frame $I(x,y)$ caught by the sensor 107, the defined interference image $F(x,y)$ is utilized to process the current frame $I(x,y)$ to generate the compensated frame $I'(x,y)$. The compensating can utilize lightness of the pixels surrounding a specific pixel having lightness higher than a first predetermined value or lower than a second predetermined value (i.e. the pixel that is too bright or too dark), to compensate the specific pixel. Also, the compensating can be performed to a part including pixels having larger lightness variation level, since the part having scraping traces or dust may generate brighter or darker part, or an image having lightness variation level different from other parts.

After generating the compensated frame $I'(x,y,)$, the compensated frame $I'(x,y,)$ is compared with a reference frame $R(x,y)$ to generate displacement estimation. The reference frame can be a frame that has already been processed and has no interference image.

Practically, the current frame $I(x,y)$ in the embodiment of FIG. 3, includes the finger image FI1 caused by finger moving and an interference image part II. Also, the processing unit 113 utilizes the defined interference image $F(x,y)$ to compensate the interference image part II of the current frame $I(x,y)$, to generate a compensated frame $I'(x,y)$. As shown in FIG. 3, the compensated frame $I'(x,y)$ only has the finger image FI and has no interference image part II. Then, the processing unit 113 compares the compensated frame $I'(x,y)$ and the reference frame $R(x,y)$. The displacement estimation of finger 101 can be acquired via comparing theses two images, since the reference frame $R(x,y)$ also includes the above-mentioned finger image FI2.

Additionally, the processing mechanism shown in FIG. 2 can be shown as following equations:

$$F'(x,y)=F(x,y)*\alpha+I(x,y)*(1-\alpha) \qquad \text{Equation (1)}$$

$$I'(x,y)=f(I(x,y),F(x,y)) \qquad \text{Equation (2)}$$

$$\text{corr}(I'(x,y),R(x,y)) \qquad \text{Equation (3)}$$

Equation (1) indicates the original defined interference image $F(x,y)$ is multiplied with a weighting value $\alpha$ and the current frame is multiplied with $(1-\alpha)$, while updating the original defined interference image $F(x,y)$ to a new defined interference image $F'(x,y)$. By this way, too large difference for the new defined interference image $F'(x,y)$ can be avoided. The weighting value can be a value generated by various experiments, or a value determined by detected image quality or lightness.

Equation (2) indicates the compensated frame $I'(x,y)$ is generated via performing a logic operation to the current frame $I(x,y)$ and the defined interference image $F(x,y)$. In the embodiment shown in FIG. 3, the compensated frame $I'(x,y)$ is generated via subtracting the defined interference image $F(x,y)$ from the current frame $I(x,y)$, that is, $I'(x, y)=I(x,y)-F(x,y)$. Please note any logic operation that can remove the defined interference image $F(x,y)$ from the current frame $I(x,y)$, or decrease the affect that the interference image $F(x,y)$ causes to the current frame $I(x,y)$ should also fall in the scope of the present invention. Besides, the equation can be regarded as a step of utilizing lightness of the pixels surrounding the interference image part II to compensate the current frame I(x,y), since the defined interference image F(x,y) also includes pixels at edges of the interference image part II.

Equation 3 indicates comparing the compensated frame I'(x,y) with the reference frame R(x,y) to estimate displacement.

Figure 4:
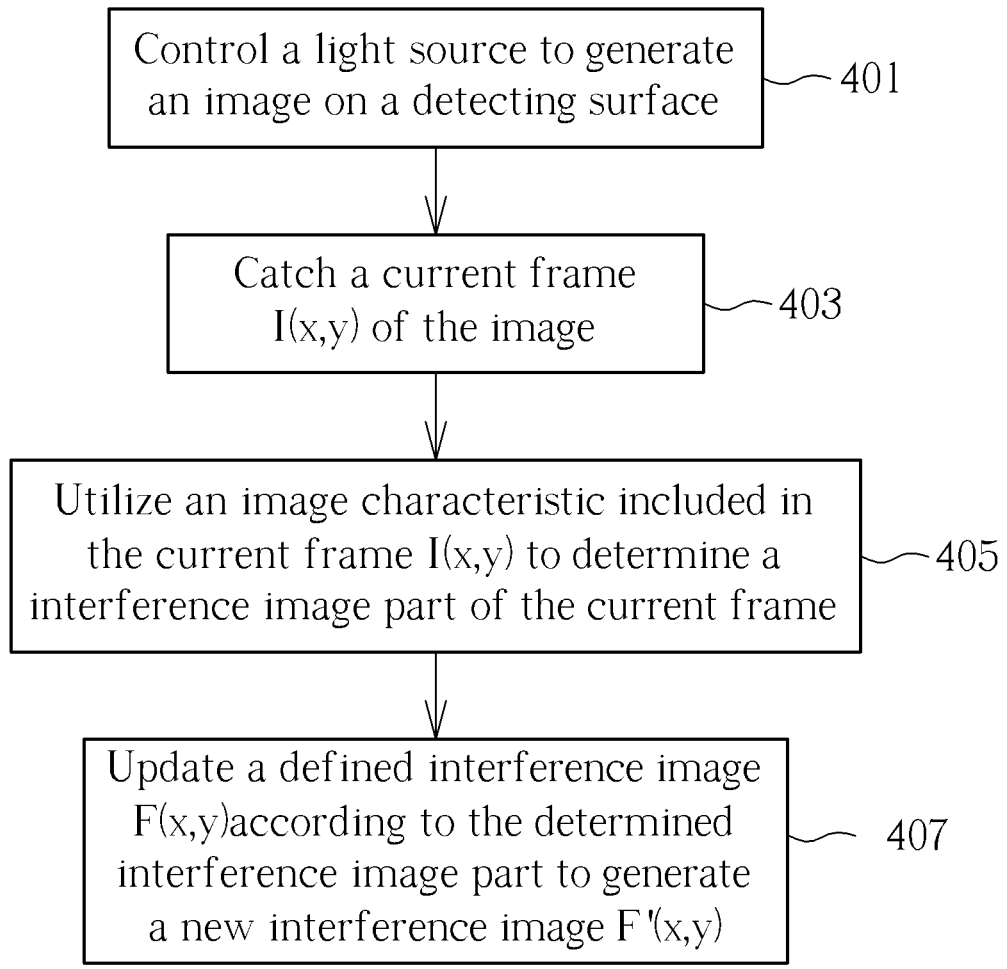
FIG. 4 is a flow chart illustrating summarized steps for an interference image determining method according to one embodiment of the present invention.

In view of above-mentioned embodiments, an interference image determining method including summarized steps can be acquired. FIG. 4 is a flow chart illustrating summarized steps for an interference image determining method according to one embodiment of the present invention. The interference image determining method includes the following steps:

Step 401

Control a light source to illuminate an object, such as a finger or any object that be utilized for touch control, on a detecting surface to generate an image.

Step 403

Catch a current frame I(x,y) of the image.

Step 405

Utilize an image characteristic included in the current frame I(x,y) to determine an interference image part of the current frame. In view of above-mentioned description, the step of determining the interference image part can be regarded as utilizing an image characteristic included in the current frame I(x,y) to determine, since the compensated frame I'(x,y) is generated via compensating too light/too dark pixels, or via compensating pixels having lightness variation level different from other parts.

Step 407

Update a defined interference image F(x,y) according to the determined interference image part to generate a new interference image F'(x,y).

The above-mentioned embodiments can be performed via writing a firmware into a processing unit. Alternatively, the above-mentioned embodiment can be performed via writing a program code into a computer readable media and executing the program code. Therefore, unnecessary hardware and cost can be saved. Additionally, the interference image determining method provided by the present invention can compute the interference image part via simple steps, thus no complicated algorithm is needed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable medium, having at least one program code recorded thereon, an interference image determining method can be performed when the program code is read and executed, wherein the interference image determining method comprises:
  (a) controlling a light source to illuminate an object on a detecting surface to generate an image;
  (b) controlling a sensor to catch a current frame of the image;
    determining whether the object can be detected in the current frame of the image; and
    determining whether displacement of the object has occurred when determined that the object can be detected in the current frame;
  (c) utilizing an image characteristic included in the current frame to determine an interference image part of the current frame, the interference image part being a still image part generated from the presence of at least one of a scraping trace, a finger print and dust located on the detecting surface that causes fixed interference effects; and
  (d) updating a defined interference image according to the determined interference image part when determined that displacement of the object has occurred and not updating the defined interference image according to the determined interference image part when the object can be detected in the current frame and that displacement of the object has not occurred.

2. The non-transitory computer readable medium of claim 1, wherein the object is a finger or an object that can perform a touch control function.

3. The non-transitory computer readable medium of claim 1, wherein the object is a plane.

4. The non-transitory computer readable medium of claim 1, wherein the image characteristic is lightness of a pixel.

5. The non-transitory computer readable medium of claim 1, wherein the image characteristic is lightness variation level of a pixel.

6. The non-transitory computer readable medium of claim 1, wherein the method further comprises updating the defined interference image according to the determined interference image part when determined that the object cannot be detected in the current frame.

7. The non-transitory computer readable medium of claim 6, wherein the step (c) includes:
  (c1) utilizing the defined interference image to compensate the current frame to generate a compensated frame; and
  (c2) performing displacement estimation to the object on the detecting surface according to the compensated frame;
  wherein the step (d) updates the defined image after the step (c2) determines that the object has displacement.

8. The non-transitory computer readable medium of claim 7, wherein the step (c1) utilizes lightness values of pixels surrounding the pixel including the image characteristic to compensate the pixel including the image characteristic.

9. The non-transitory computer readable medium of claim 7, wherein the step (c) determines a non-moving image part as the interference image part when the step (c2) determines that the object has displacement.

10. The non-transitory computer readable medium of claim 7, wherein the step (c1) performs a logic computing operation to the current frame and the defined interference image to generate the compensated frame.

11. The non-transitory computer readable medium of claim 10, wherein the step (c1) subtracts the defined interference image from the current frame to generate the compensated frame.

12. The non-transitory computer readable medium of claim 1, wherein the step (d) multiplies the defined interference image by a weighting value and multiplies the current frame by (1-the weighting value) to update the defined interference image, wherein the weighting value is between 0 and 1.

13. The non-transitory computer readable medium of claim 12, wherein the weighting value is a predetermined value, or determined by quality of the image, or determined by lightness of the image.

14. An interference image determining apparatus comprises:
  a detecting surface;
  a light source;
  a processing unit, for controlling the light source to illuminate an object on the detecting surface to generate an image;
  a sensor, for capturing a current frame of the image; and a storage apparatus, for storing a defined interference image;

wherein the processing unit utilizes an image characteristic included in the current frame to determine an interference image part of the current frame, the interference image part being a still image part generated from the presence of at least one of a scraping trace, a finger print and dust located on the detecting surface that causes fixed interference effects, updates a defined interference image according to the determined interference image part when determined that displacement of the object has occurred, and does not update the defined interference image according to the determined interference image part when the object can be detected in the current frame and that displacement of the object has not occurred.

15. The interference image determining apparatus of claim 14, wherein the object is a finger or an object that can perform a touch control function.

16. The interference image determining apparatus of claim 14, wherein the object is a plane.

17. The interference image determining apparatus of claim 14, wherein the image characteristic is lightness of a pixel.

18. The interference image determining apparatus of claim 14, wherein the image characteristic is lightness variation level of a pixel.

19. The interference image determining apparatus of claim 14, wherein the processing unit updates the defined interference image according to the determined interference image part when determined that the object cannot be detected in the current frame.

20. The interference image determining apparatus of claim 19, wherein the processing unit performs following steps to perform the step of determining an interference image part of the current frame:

(c1) utilizing the defined interference image to compensate the current frame to generate a compensated frame; and (c2) performing displacement estimation to the object on the detecting surface according to the compensated frame;

wherein the processing unit updates the defined image after the step (c2) determines that the object has displacement.

21. The interference image determining apparatus of claim 20, wherein the step (c1) utilizes lightness values of pixels surrounding the pixel including the image characteristic to compensate the pixel including the image characteristic.

22. The interference image determining apparatus of claim 20, wherein the processing unit determines a non-moving image part as the interference image part when the step (c2) determines that the object has displacement.

23. The interference image determining apparatus of claim 20, wherein the step (c1) performs a logic computing operation to the current frame and the defined interference image to generate the compensated frame.

24. The interference image determining apparatus of claim 23, wherein the step (c1) subtracts the defined interference image from the current frame to generate the compensated frame.

25. The interference image determining apparatus of claim 14, wherein the processing unit multiplies the defined interference image by a weighting value and multiplies the current frame by (1-the weighting value) to update the defined interference image, wherein the weighting value is between 0 and 1.

26. The interference image determining apparatus of claim 25, wherein the weighting value is a predetermined value, or determined by quality of the image, or determined by lightness of the image.

* * * * *